United States Patent [19]

Washo

[11] Patent Number: 4,580,877
[45] Date of Patent: Apr. 8, 1986

[54] COMBINED DISPLAY PANEL OF LIQUID CRYSTAL DISPLAY AND ELECTROLUMINESCENT DISPLAY

[75] Inventor: Junichi Washo, Yamatokoriyama, Japan

[73] Assignee: Sharp Kabushiki Kaisha, Osaka, Japan

[21] Appl. No.: 395,468

[22] Filed: Jul. 6, 1982

[30] Foreign Application Priority Data

Jul. 10, 1981 [JP] Japan .............. 56-103718[U]

[51] Int. Cl.⁴ ............................................. G02F 1/13
[52] U.S. Cl. ................................................... 350/345
[58] Field of Search ......................................... 350/345

[56] References Cited

U.S. PATENT DOCUMENTS

| | | | | |
|---|---|---|---|---|
| 3,840,695 | 10/1974 | Fischer | ............ | 350/345 X |
| 3,881,809 | 5/1975 | Fergason et al. | ............ | 350/345 X |
| 4,196,973 | 4/1980 | Hochstrate | ............ | 350/345 X |
| 4,208,869 | 6/1980 | Hanaoka | ............ | 350/345 X |
| 4,212,048 | 7/1980 | Castleberry | ............ | 350/345 X |

FOREIGN PATENT DOCUMENTS 2054119A  2/1981  United Kingdom ............ 350/345

*Primary Examiner*—John K. Corbin
*Assistant Examiner*—Richard F. Gallivan
*Attorney, Agent, or Firm*—Birch, Stewart, Kolasch & Birch

[57] ABSTRACT

A combined display panel comprises a liquid crystal display (LCD) and an electroluminescent display (EL). In addition to the conventional emitting agents, an electroluminescent layer of the EL contains a pigment element for reflecting radiation toward the LCD. Preferably, the LCD is a guest-host type and the EL is a powder type. The material of the pigment element may be selected from a white pigment including barium titanate and titanium oxide. A semi-transparent film such as a parchment paper may be inserted between the LCD and the EL.

9 Claims, 3 Drawing Figures

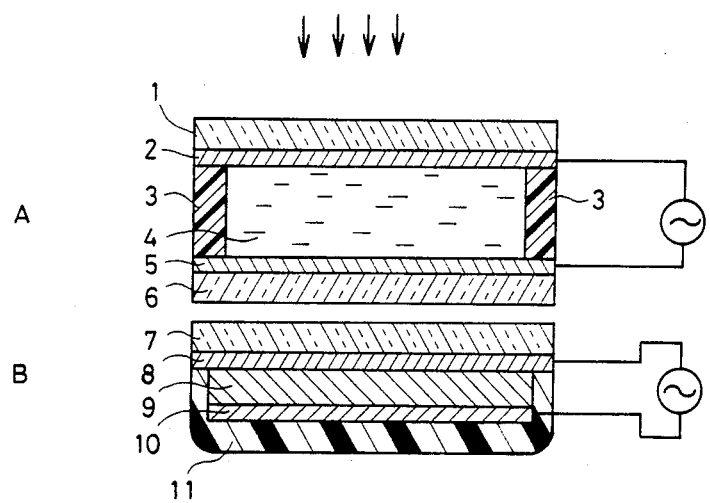
FIG. 1
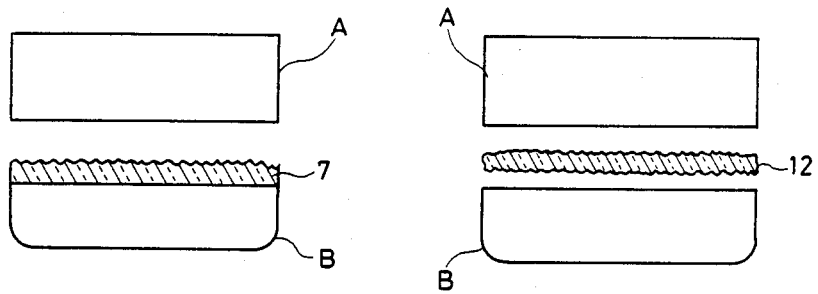
FIG. 2
FIG. 3

COMBINED DISPLAY PANEL OF LIQUID CRYSTAL DISPLAY AND ELECTROLUMINESCENT DISPLAY

BACKGROUND OF THE INVENTION

The present invention relates to a display panel and, more particularly, to a combined display panel of a liquid crystal display (referred to as LCD hereinafter) and an electroluminescent display (referred to as EL hereinafter).

A combined display panel of LCD and EL has been proposed in which EL is positioned behind LCD to emit light, in response to application of an electric field, in the absence of incident light upon LCD. Uniform illumination could be obtained from EL according to this construction.

However, when the light is incident upon the LCD, the EL is rendered inoperative, so that the EL is useless in such a case.

Therefore, it is desired to highly utilize EL when the light is incident upon LCD.

SUMARY OF THE INVENTION

Accordingly, it is an object of the present invention to provide an improved combined display of LCD and EL.

It is another object of the present invention to provide an improved combined display panel of an LCD and EL in which EL is utilized even in the absence of incident light upon the LCD.

It is a further object of the present invention to provide an improved combined display panel of LCD and EL which contains a pigement material for reflecting radiation toward the LCD, even in the absence of incident light upon the LCD.

Briefly described, in accordance with the present invention, a combined display panel of LCD and EL is characterized in that an electruluminescent layer of EL contains a pigment material for reflecting radiation toward LCD in the presence of incident light upon the LCD. When the light is not incident upon LCD, the EL is activated to provide electroluminescence. The material of the pigment material may be selected from a white pigment including barium titanate and titanium oxide ets. A semi-transparent film such as a parchment paper may be inserted between LCD and EL. Preferably, LCD is a guest-host type and EL is a powder type.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 shows a sectional view of a combined display panel of LCD and EL according to a preferred embodiment of the present invention;

FIG. 2 shows a sectional view of another combined display panel of LCD and EL according to another preferred embodiment of the present invention; and FIG. 3 shows a cross sectional view of a further combined display panel of LCD and EL according to a further preferred embodiment of the present invention.

DESCRIPTION OF THE INVENTION

A combined display panel of LCD and EL of the present invention will be described in terms of usage of a guest host type LCD(GH-LCD). GH-LCD can provide a pleochroic feature depending on the material of a liquid crystal material to be used. Further, it is devoid of any reflecting plate unlike a twisted nematic type LCD(TN-LCD). If the reflecting plate is employed for LCD, transparency to incident light is remarkably reduced, so that the display contrast is also decreased. To avoid reduction of the display contrast, GH-LCD is preferable.

With reference to FIG. 1, a combined display panel comprises a LCD panel A and a powder type-EL panel B. The LCD panel A comprises a glass substrate 1 at the display side and transparent electrodes 2 and 5, sealing members 3, a GH-type liquid crtstal material 4, and a glass substrate 6 at the rear side.

The EL panel B comprises a glass substrate 7 at the display side, a transparent electrode 8, an EL layer 9 for illuminating LCD and reflecting the radiation toward LCD, an electrode 10 at the rear side, and a moisture-resistant film 11. It may be possible that the substrate 6 in the LCD panel A and the substrate 7 in the EL panel B are provided by a single common glass substrate.

According to the present invention, the EL layer 9 contains a white pigment such as barium titanate, titanium oxide, or the like, in addition to the conventional light-emitting elements including emitting agents such as ZnS, ZnSe, CdS or the like and additional active agents such as transition elements such as Mn, Cr or the like, and rare earth elements such as Eu, Sm or the like. The white pigments is provided for establishing the light-reflecting feature of the EL layer 9. It is prefereable that the material of the white pigment is selected to have a high reflection coefficient and large dielectric constant. Therefore, it should not be limited to the above examples.

The EL layer 9 emits uniform electroluminescence over its entire surface in response to application of a high electric field. When a bright surrounding light is present with the help of the sun or an illumination, it assures a light-reflection feature.

The electrode 10 of the EL panel B is made of an electrode evaporated with a highreflection metal such as Al in order to direct the electroluminescence from the EL panel B into the LCD panel A. The moisture-resistant film 11 is provided for protecting the EL layer 9 from introduction of moisture from the surrouding. The material of the film 11 is selected to be an organic film including polyvynyl chloride, polyester or the like.

FIG. 2 shows another preferred form of the present invention. The surface of the glass substrate 7 of the EL panel B is made rugged, so that the radiation passing through the LCD panel A and the electroluminescence from the EL layer 9 are highly scattered.

FIG. 3 shows a further preferred form of the present invention. A semi-transparent film 12 such as a parchment paper or the like is inserted between the LCD panel A and the EL panel B. This arrangemt can scatter the radiation passing through the LCD panel A and the electroluminescence from the EL layer 9.

While only certain embodiments of the present invention have been described, it will be apparent to those skilled in the art that various changes and modifications may be made therein without departing from the spirit and scope of the invention as claimed.

What is claimed is:

1. A combined display panel comprising:

a liquid crystal display containing a liquid crystal layer; and an electroluminescent display including an electroluminescent layer;

the electroluminescent layer containing a pigment element for reflecting radiation toward the liquid crystal layer, in addition to agents for emitting electroluminescence.

2. The display of claim 1, wherein the liquid crystal display is the guest-host type.

3. The display of claim 1, wherein the electroluminescent display is the powder type.

4. The display of claim 1, wherein the pigment element provides white color.

5. The display of claim 1, wherein the material of the pigment element is selected from the group consisting of barium titanate or titanium oxide.

6. The display of claim 1, wherein the surface of the substrate of the electroluminescent display in front of the electroluminescent display is made rugged so that the radiation passing through the liquid crystal display and the electroluminescence from the electroluminescence layer is highly scattered.

7. The display of claim 1, further comprising a semi-transparent film disposed between the electroluminescent display and the liquid crystal display for scattering the radiation passing through the liquid crystal display and the electroluminescence from the electroluminescence layer.

8. The display of claim 7, wherein the semi-transparent film is a parchment paper.

9. A combined display panel comprising:
a liquid crystal display containing a liquid crystal layer; and an electroluminescent display including an electroluminescent layer disposed behind the liquid crystal display to provide illumination therefor;

said electroluminescent layer containing a pigment element for reflecting radiation toward the liquid crystal layer in the presence of incident light upon the liquid crystal device or upon activation of the electroluminescent display to provide electroluminescence in the absence of incident light upon the liquid crystal display.

* * * * *